United States Patent [19]

Schwarz et al.

[11] Patent Number: 5,020,229

[45] Date of Patent: Jun. 4, 1991

[54] APPARATUS AND METHOD FOR MEASURING SCREW THREADS

[75] Inventors: Volker Schwarz, Zimmern; Manfred Mayer, Schramberg, both of Fed. Rep. of Germany

[73] Assignee: Mauser-Werke Obernourf GmbH, Oberndorf, Fed. Rep. of Germany

[21] Appl. No.: 401,560

[22] Filed: Aug. 28, 1989

Related U.S. Application Data

[63] Continuation of Ser. No. 57,795, Jun. 3, 1987, abandoned, which is a continuation-in-part of Ser. No. 758,209, Jul. 22, 1985, abandoned, which is a continuation-in-part of Ser. No. 490,354, May 2, 1983, abandoned.

[30] Foreign Application Priority Data

May 13, 1982 [DE] Fed. Rep. of Germany ....... 3217995

[51] Int. Cl.[5] ............................................ G01B 7/28

[52] U.S. Cl. .................................. 33/199 R; 33/501.7

[58] Field of Search ........... 33/199 R, 199 B, 179 SR, 33/356-561, 501.7, 501.8, 501.9, 501.14

[56] References Cited

U.S. PATENT DOCUMENTS

| | | | |
|---|---|---|---|
| 1,256,767 | 2/1918 | Wolfe | 33/199 R |
| 1,281,805 | 10/1918 | Metzger et al. | 33/199 R |
| 2,258,760 | 10/1944 | Hecker | 33/199 R |
| 2,392,301 | 1/1946 | Aller | 33/199 R |
| 2,560,589 | 7/1951 | Mundel | 33/199 R |
| 2,938,275 | 5/1960 | Hofler | 33/179.5 R |
| 3,388,476 | 6/1968 | Johnson | 33/199 R |
| 3,508,337 | 4/1970 | Reef | 33/179.5 R |
| 3,631,603 | 1/1972 | Munro et al. | 33/179.5 R |
| 3,869,799 | 3/1975 | Neuer et al. | 33/169 R |
| 3,936,946 | 2/1976 | Ruffner et al. | 33/179.5 R |
| 4,275,507 | 6/1981 | von Haas | 33/199 R |
| 4,521,971 | 6/1985 | Mayer | 33/199 B |
| 4,621,434 | 11/1986 | Hirschmann | 33/558 |

FOREIGN PATENT DOCUMENTS

| | | | |
|---|---|---|---|
| 742108 | 10/1943 | Fed. Rep. of Germany | 33/199 R |
| 3134246 | 3/1983 | Fed. Rep. of Germany | 33/179.5 R |

*Primary Examiner*—Harry N. Haroian
*Attorney, Agent, or Firm*—McGlew & Tuttle

[57] ABSTRACT

A method and device for measuring screw threads on tubes connecting sleeves or the like, by means of a measuring pin which is moved to measured surfaces in two mutually independent measuring directions offset by 90° from each other. The two measuring directions are associated with a force direction effective as a resultant. The measuring pin further has an advance deflection in each of the two measuring directions which are annulled at the point contact of the measuring pin with the measured surfaces.

3 Claims, 4 Drawing Sheets

Fig.7
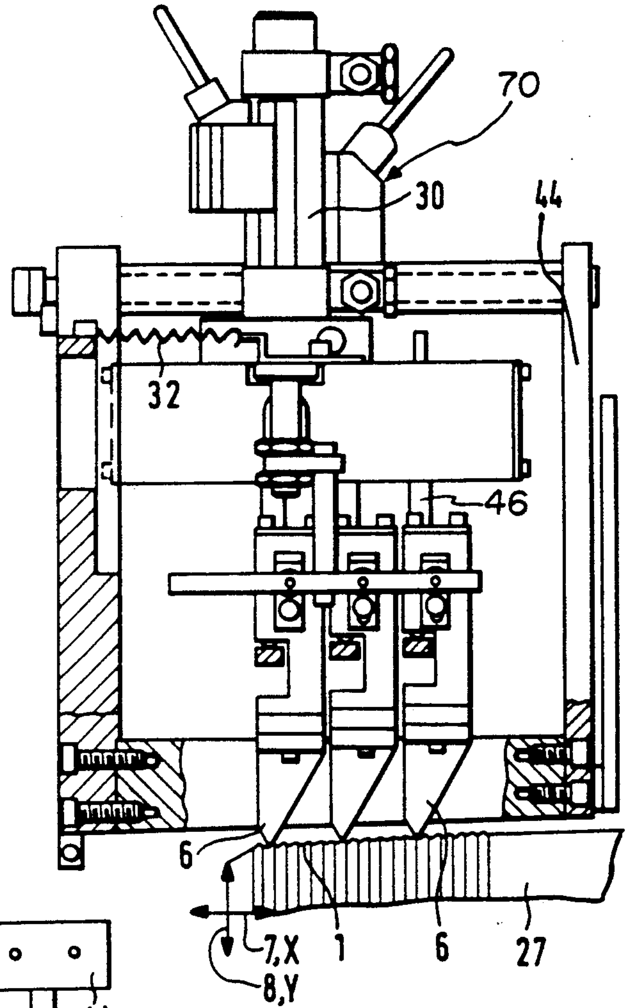
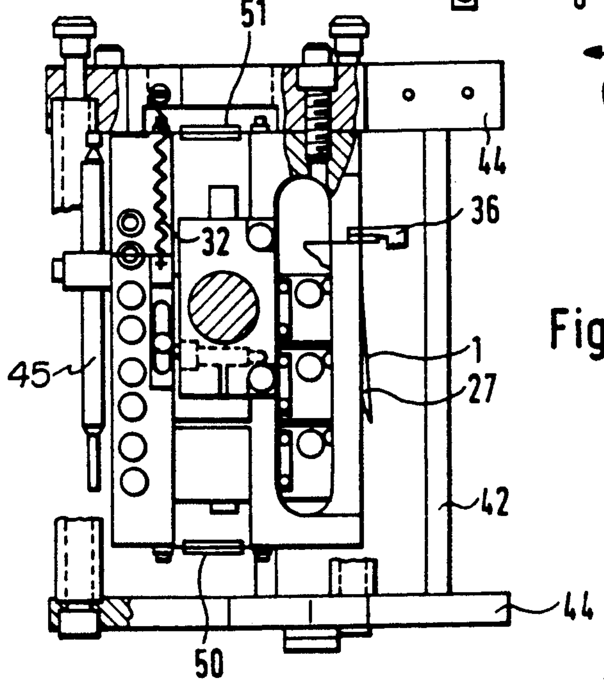
Fig.8

APPARATUS AND METHOD FOR MEASURING SCREW THREADS

CROSS REFERENCE TO RELATED APPLICATIONS

This is a file wrapper continuation application of application Ser. No. 07/057,795 filed June 3, 1987, now abandoned, which is a continuation-in-part of Ser. No. 758,209, filed July 22, 1985, now abandoned, which is a continuation-in-part of Ser. No. 490,354 which was filed May 2, 1983, now abandoned, by the same inventors of the present invention.

This application is also related to the subject matter found in a previous application filed by one of the inventors, Ser. No. 502,125, filed May 8, 1983 and entitled MEASURING HEAD FOR SCREW THREAD MEASURING MACHINES, now U.S. Pat. No. 4,521,971 which was granted June 11, 1985. This U.S. Pat. No. 4,521,971, is incorporated here by reference.

FIELD AND BACKGROUND OF THE INVENTION

This invention relates in general to measuring devices and methods and in particular to a new and useful device and method for measuring screw threads.

Both individual devices and automatic measuring arrangements are known for measuring screw threads. The individual devices are primarily employed for measuring the diameter, depth, flank steepness, form and taper of internal as well as external threads. Of the individual devices that are known, primarily dial and slide gauges are used. Even though such devices are handy and precise in use, they are not very suitable for series measurements, since they require time and are expensive.

Aside from these individual devices, fully automatic systems are known for measuring the minor diameter, taper, pitch and depth of exterior threads. Particular requirements are imposed on automatic measuring systems if external threads of large tubes for oil pipelines are to be measured in rapid succession on a large scale with precision.

Because of their dimensions, such tubes are difficult to handle and consequently, not easy to measure. Several manual measuring systems exist which require an operator or the like to be heavily involved in all of the steps of measurement.

U.S. Pat. No. 1,281,805 issued to Metzger teaches a workpiece with an article having an external thread placed in a corresponding holder and moved manually, by a gear drive with respect to measuring probes. The measuring probes 23 and 24 are installed on a stationary head as a flat plate 10 for the probe 23 and as a plate 29 movable on the head for the probe 24. The probe 23 penetrates into the thread 13. This determines the first position. The second measuring probe is moved over the thread axially by hand and is inserted into the first, second, third or other thread course at a distance from the first probe 23. A dial gauge indicates the axial distance, from which the pitch of the thread is determined. With this device, therefore, the axially contacting probe (on the front face of the workpiece) for determining the right measuring position of the thread is lacking. The probe 23 is run rigidly in a thread groove without detecting whether there is a precise radial or axial point contact.

In this reference, no measurement is made as to whether the threaded body is round, whether a cone is present, or of the thread depth and the pitch diameter of the thread. Only superficially precise measurements may be made by the device of Metzger by a simply shaped probe and use of manual shifting.

U.S. Pat. No. 2,938,275 issued to Hofler teaches a device for measuring gears. The device uses two calipers spaced from each other whereby the spacing and the number of teeth between the calipers can be determined. Between these two calipers, over an arc, is a pair of measuring tracers with which the teeth of a gear are measured with respect to their flanks (sides) and also the distance over the arc. The problems in measuring a thread are entirely different from those in measuring a gear. While the teeth of the gear to be measured according to Hofler are always in uniform arrangement around the entire gear on the circumference thereof in a certain gear width, a thread naturally extends spirally over an axial length of a workpiece due to a pitch. This means that the entire measuring process must take place differently in a thread measuring device than in a gear testing device. For this reason, the device taught by Hofler does not solve any of the problems which the present invention attempts to solve.

SUMMARY OF THE INVENTION

The present invention is directed to a method and device which would be suitable for measuring external threads of large tubes, especially their minor or core diameter, pitch and depth, in a quick reliable and inexpensive way.

According to the present invention, a first measuring probe is provided and a second measuring probe is pre-positioned above the thread to be measured and is then inserted radially into the thread to be measured, and is only then brought axially to the point contact by axial displacement of a measuring head. The measurement positions of the first and second probes are calculated relative to one another. A movable probe (movable in an axial direction only) is inserted into a thread groove after counting succeeding thread grooves and the axial separation is then measured.

It is an object of the invention to provide an apparatus and method for measuring screw threads which takes into account whether the threaded body is round, whether a cone is present, and the thread depth and the pitch diameter of the thread.

In accordance with the invention, it is provided that the measuring pin is moved to the measured surfaces simultaneously into two linear measuring directions which are independent of each other and which are offset relative to each other by 90° (ninety degrees), and that is the two measuring directions which are associated with a force direction, effective as a resultant, the measuring pin exhibits an advance deflection which may be annulled at the point contact of the measuring pin with the measured surfaces.

The critical advantage of the invention is that the measuring pin is deflected in advance in the two measuring directions and that a force direction effective as a resultant is associated with the two measuring directions. In consequence, the measuring pin can be moved to the surfaces to be measured and brought into contact with one of the measured surfaces, and the moving into contact with the other measured surface can be effected without detaching the measuring pin from the surface.

The desired position of the measuring pin is thus found in a simple, quick, and reliable manner.

In a preferred embodiment of the invention, the advance deflection of the measuring pin is produced by a force acting in the measuring direction caused by a weight, a spring or the like. The measuring pin has a ball head.

The inventive method carried out with a corresponding device may advantageously be applied to the measurement of threads on tubes, connecting sleeves, etc. The measuring of the minor diameter, pitch and depth of buttress threads and round threads.

Accordingly, it is an object of the invention to provide a method for measuring screw threads using a measuring pin comprising moving the pin into contact with two measured surfaces forming an angle with each other, a biasing force is applied to urge the end of the pin simultaneously into two linear measuring directions which are independent of each other and offset relative to each other by 90° (ninety degrees). The force in the two measuring directions causes a force resultant direction which would cause an advance deflection of the pin. This advance deflection is anulled or counterbalanced at the point of contact of the measuring pin with the measured surfaces.

The device for measuring advantageously comprises a measuring pin which is connected to a measuring head carried for axial motion and which is associated with a measuring device, the pin being movable in an axial direction, the measuring apparatus further including another measuring pin for contacting the front face of the article to be measured in order to find or establish a measuring or free position of the measuring head over the thread and comprising a seeker pin which moves radially into the groove of the thread by stopping the axial motion of the measuring head, said pin being movable to the measured surfaces simultaneously in two linear directions independently of each other and offset relative to each other by 90° (ninety degrees). The measuring directions with a force direction being effective as a result of each measuring pin exhibiting an advance deflection which may be annulled at a point of contact of the measuring pin with the measuring surface.

An object of the invention is to provide an improved method and apparatus which are both simple to carry out and provide an easy means of effecting the same and are inexpensive.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

In the drawings:

FIG. 7 shows another view of the measuring head station along the line VII—VII in FIG. 5;

FIG. 8 shows still another view of the measuring head station along line VIII—VIII in FIG. 5.

DESCRIPTION OF THE PREFERRED EMBODIMENTS

With reference to the drawings, a measuring device for measuring external threads on pipes is described, that has a measuring probe, which has a shaft 6 and a spherical head 6a.

Figure 1:
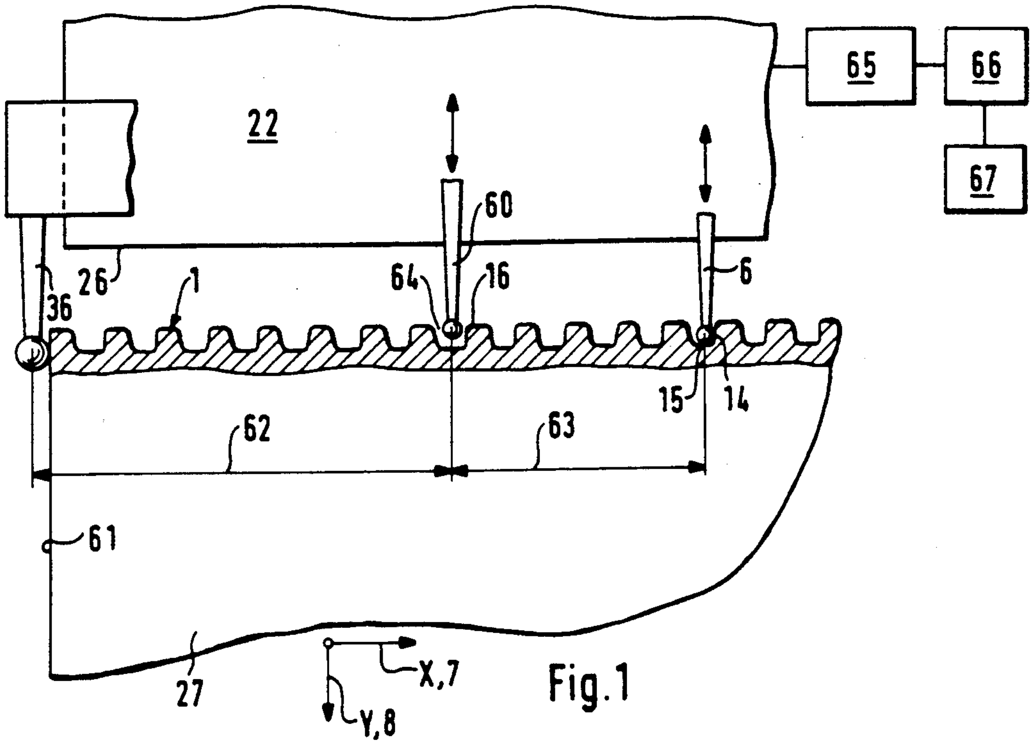
FIG. 1 is a partial cross-sectional view of a thread with schematic illustration of the measuring head with measuring probes.

FIG. 1 illustrates the thread 1 of the pipe 27 to be measured in partial cross section. Above the thread 1 is the measuring head 22, which has a central opening 26 for introducing the pipe 27 and has several measuring probes 6, 36 and 60.

The measuring probe 36 is fastened to the measuring head 22 and is adjusted to contact the front face 61 of the pipe 27 or the thread 1 axially. The pipe 27 with the thread 1 is placed in the measuring device and the annular measuring head 22, such as the annular measuring head arrangement shown in U.S. Pat. No. 4,521,971 (see also FIG. 5 showing a section of the annular measuring head), travels over the pipe with its central opening 26. This axial motion in the coordinate direction 7 or X occurs until the measuring probe 36 contacts the face 61 of the thread 1. The measuring probe then remains in contact at this face 61. A so-called hunting pin 60 on the measuring head 22 is provided at a definite distance 62 from the first measuring probe 36, which is moved radially up to the thread 1. The hunting pin 60 penetrates radially into a thread groove 64. The measuring head 22 is then moved axially in the direction X until the hunting pin 60 comes into contact with the flank 16 of the thread groove 64. The axial distance 62 between the measuring probe 36 and the hunting pin 60 is always within a tolerance range of +1 turn of the thread set, in the control 65 of the measuring head. In the example of FIG. 1, the measuring head 22 travels until the hunting pin 60 is approximately over the eighth thread groove 64 measured from the face 61. Because the pipe can assume any arbitrary rotational position, the hunting pin 60 is usually located between the seventh and ninth thread grooves 64 of the thread 1. The measuring machine, through a connected computer 66, relates the positions of the measuring probe 36 and of the hunting probe 60 to one another and determines the precise dimension 62 between them. This dimension 62, that is determined, is compared in the computer 66 with the input standard for the thread 1, so that it can be determined whether the pitch of the thread 1 is correct. Only then are measuring probes 6, that are located at a specific distance 63 from the hunting pin 60, moved radially on the thread 1 and brought into point contact for measuring the cone, pitch diameter, thread depth, profile, and pitch of the thread 1, as will be described below for FIGS. 2 through 8.

Figure 2:
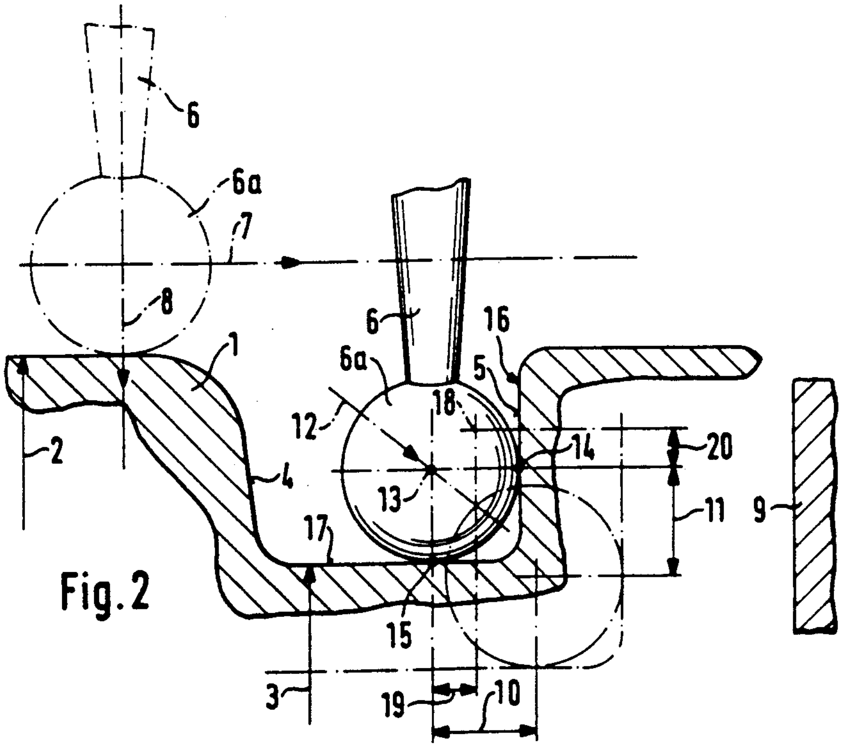
FIG. 2 is a cross sectional view of a thread with different measurement positions of a measurement probe.

FIG. 2 shows a greater enlargement of a portion of the modified rectangular thread 1 (buttress thread) with the thread outside diameter or major diameter 2, the root diameter or minor diameter 3, and the flanges 4 and 5.

The measuring probe or measuring pin 6 with the spherical head 6a is connected to the measuring head 22 (FIGS. 1 and 5) of a measuring device and contacts the thread outside diameter 2 upon reaching the free position of the measuring head 22 above the thread 1. The measuring probe 6 is then moved simultaneously from this contact position in the axial direction 7 and radial direction 8. The measuring device then has a position at approximately 9 as indicated in FIG. 2.

Measuring pin 6, which is preferably equipped with the ball head 6a, is deflected or biased in advance in the two measuring directions 7 and 8 with the deflections or biases being indicated at 10 and 11, and considered in vectorial representation, the set of deflections combine to form a resultant in about the shown direction 12.

In the central position 13 in FIG. 2, the measuring probe 6 has reached the desired position. The forward deflections/displacements 10 and 11 in this position are still present because of the forces of the springs 32 and 34, but the deflections/displacements 10 and 11 are altered by the thread surface because of the position of the measuring probe 6 against the measurement points 14 and 15. The measuring probe 6 rests against the measurement points 14 and 15 due to the spring force. This spring force of the forward deflections 10 and 11 can also be called the measurement force. The measuring probe 6 therefore rests against the measurement points 14 and 15 on the measurement surfaces 16 and 17 of thread 1. The measured data determined by the contact position of the measuring probe 6 is evaluated in the computer 66 as a measured parameter of the thread 1 and is revealed on the indicator 67.

FIG. 2 also shows a theoretical intermediate position 18 that would be a possible position during the travel of the measuring probe 6 but for the thread surface.

In the theoretical intermediate position 18, with the deviations in the axial direction 19 and the radial direction 20 from the central position 13, the measuring probe 6 would already rest against the measurement surface 16, while the probe head 6a is still at a distance from the measurement surface 17 and thus makes no contact. The path of forward displacement in the direction 7 would already be terminated and the measuring probe 6 would be pressed back against the force of the deflection springs. The intended measurement points 14 and 15 are not reached in any case. The measuring probe 6 is then shifted out of this intermediate position 18 in the radial direction 8, remaining in contact with the measurement surface 16 because of the forward deflection 10 and the resulting force direction 12.

The advantage of the resultant direction of force 12, that is based on the forward deflection 10 and 11, lies in the fact that the measuring probe 6 remains continuously in contact with the measurement surfaces 16 or 17 when traveling, and does not have to be moved, as in device pursuant to the state of the art, always alternately in the X-direction and then in the Y-direction, and then again in the X-direction, which corresponds to a step-shaped line.

Figure 3:
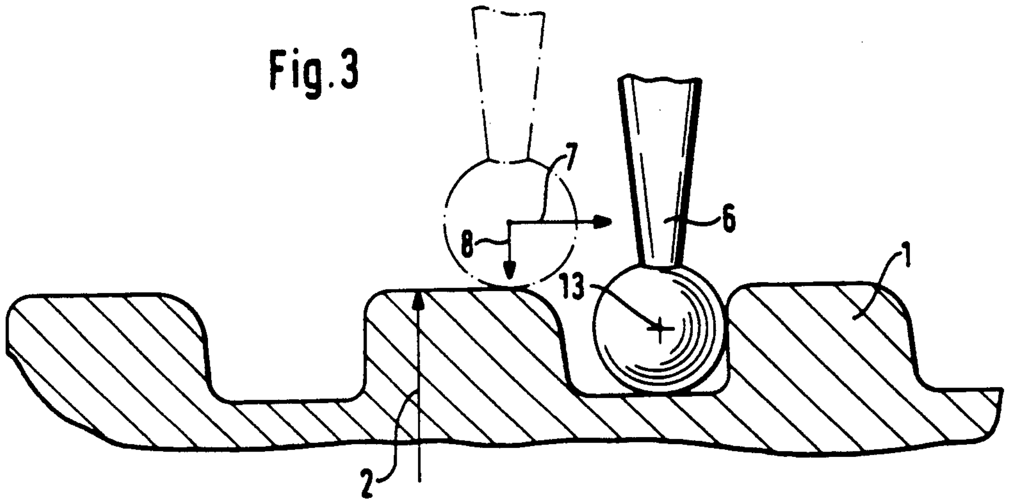
FIG. 3 shows the measuring probe resting on the outer surfaces of a buttress thread for making a measurement.
Figure 4:
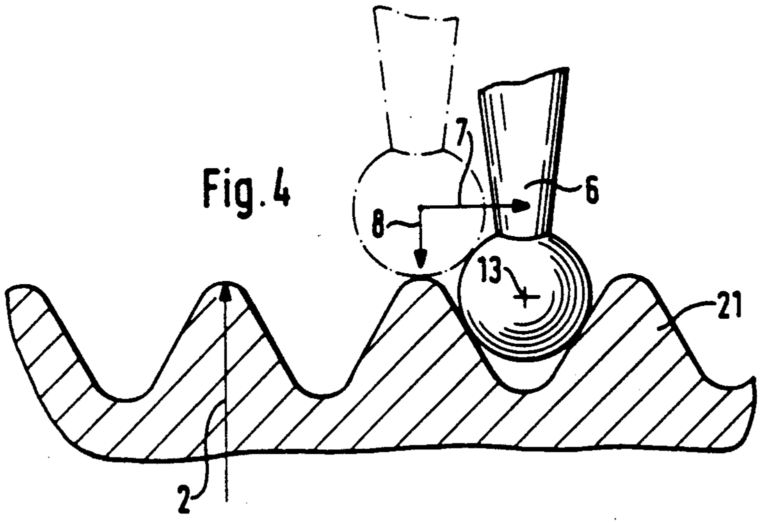
FIG. 4 shows the measuring probe resting on the outer surfaces of a round thread.
Figure 5:
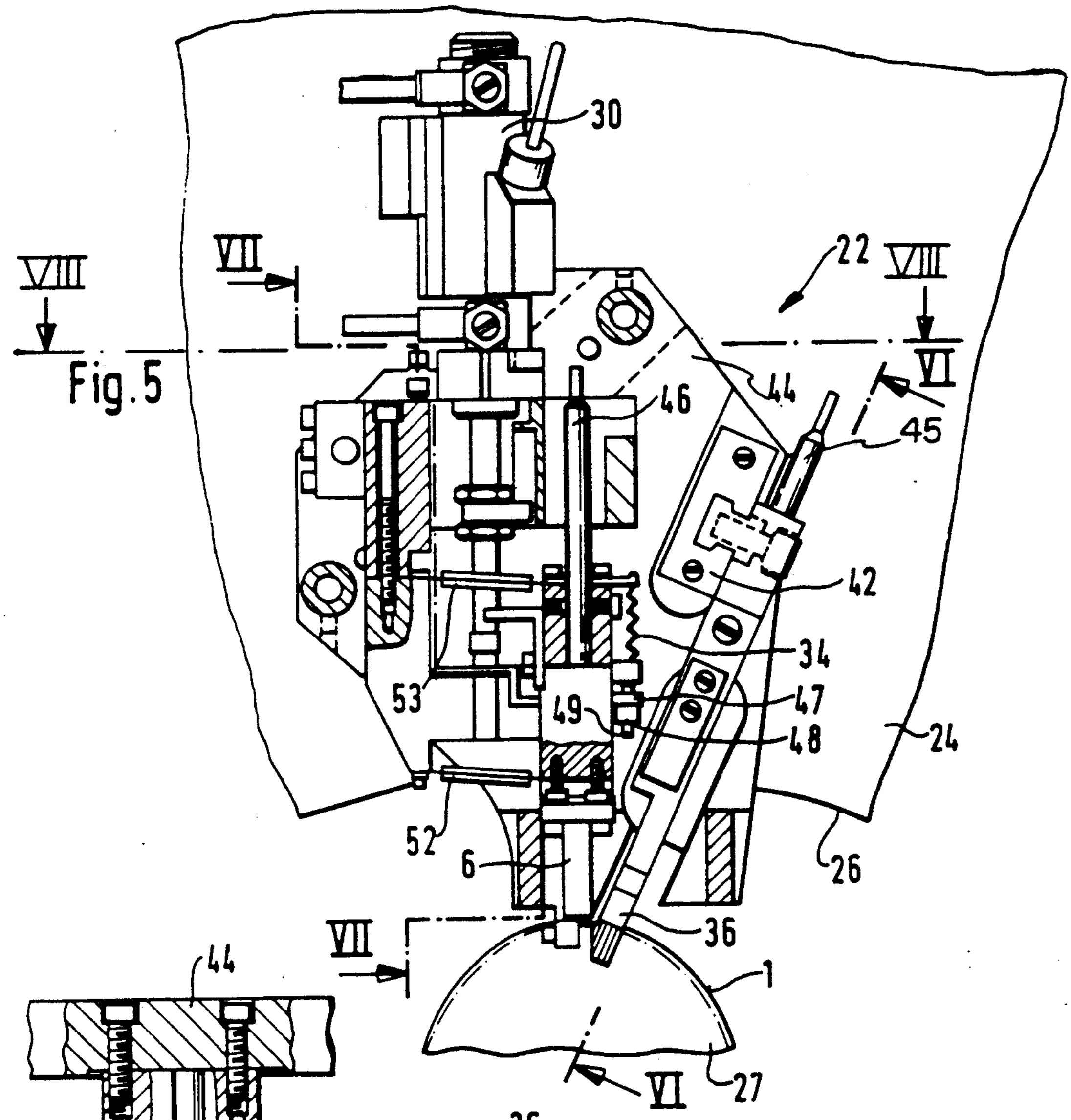
FIG. 5 shows a station of a measuring head with measuring probe and measuring pin in front view.
Figure 6:
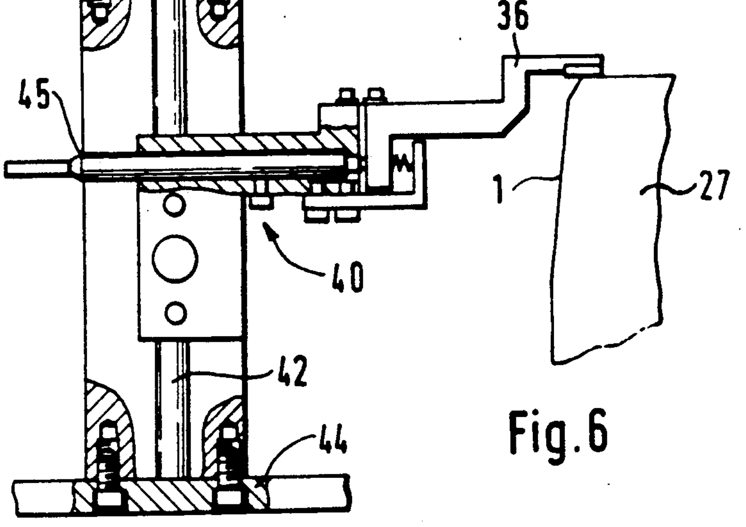
FIG. 6 shows a view of the measuring head station along the line VI—VI in FIG. 5.

FIGS. 3 and 4 show the measuring probe 6 in each case in the starting position on the thread outside diameter (broken line) and in the desired position 13 with contact against the measurement faces of the thread 1. FIG. 3 shows the measurement of a buttress thread 1, and FIG. 4 shows the measurement of a round thread 21.

FIGS. 5 and 8 show a measuring head or measuring station 22 which is composed of several individual stations with measuring probes. The measuring head 22 is fastened to a rigid plate 24, with the plate 24 having a central opening 26 to hold a pipe 27 with a thread 1. The measuring head 22 is positioned on the plate 24 in such a way that it can be driven into selected positions and the measuring probes 6, 36 and 60 can be brought close to the pipe threads, as disclosed in U.S. Pat. No. 4,521,971.

According to FIGS. 5 and 7, there are a total of three measuring probes 6 on a measuring head 22 for measuring the thread 1.

These measuring probes 6 are moved by moving a thrust cylinder 30 in such a way that in the bottom position they contact the thread 1 and in the upper position they stand above the thread 1. The measuring probe 6 is in a parallelogram suspension that is formed by the parallel springs 50 and 51 and the pair of springs 52 and 53 at right angles to them. The measuring probe 6 is held by a spring 32 in forward deflection 10 in the direction X or 7. Another spring 34 deflects the measuring probe 6 in the direction Y or horizontal direction 8. The use of these springs 32 and 34 produces a resultant force 12 on the spherical head 6a of each measuring probe 6, which presses the spherical head against the particular measurement surface 16 or 17 of the thread 1. The deflection 10 is measured with a linear measuring sensor 46 (see FIGS. 6 and 8). The deflection 11 is measured in the y direction with a linear measuring sensor 45 (see FIGS. 5 and 7).

The lower strain point of the spring 34 in FIG. 5 is beyond the illustrated adjusting screw 47 with lock nut 48, that is drawn below the spring 34 beneath the positioning pin 49.

The measuring head 22 has a locating pin (position scanner) or first pin 36 that contacts the front end 61 of the pipe 27 in order to bring the second pin or measuring probe 6 into the thread groove 64 of the thread after positioning the probe 60. The locating probe 36 is fastened by a mount 40 to the shaft 42, which is attached immovably to the measuring head 22 by plates 44.

The measuring head 22 is fastened on its base plate 24 for axial motion in direction 7 above the pipe 27. The locating probe 36 is first brought into contact with the axial face 61 to achieve a definite set position between the workpiece (pipe 27) and the measuring head 22. The probe or pin 60 is then actuated and penetrates into a thread groove at a predetermined distance from the face 61. Only then are the measuring probes 6 actuated, which are connected to the measuring head 22 for simultaneous motion in two linear directions 7 and 8 or X and Y at right angles to one another. These motions take place relative to the pipe 27 for the point contact against the measuring surface of the thread 1. The springs 32 and 34 act as the means for the forward deflections and the sloping direction of the force. The forward deflection 10 of the measuring probe 6 is measured, for example, by the linear measuring sensor 45. The forward deflection 10 of the measuring probe 6 in the coordinate direction is measured by the second linear measuring sensor 46.

The advanced deflection amount discussed above and shown in phantom line in FIG. 2, is the position to which the head 6a of the measuring pin 6 would go if the work piece was not present. The solid lines in FIG. 2 show a punctual contact at points 14 and 15 of the surface of the measuring ball 6a against the thread surfaces 16 and 17 which are the so-called measured surfaces which extend at an angle to each other.

The same biasing force which is capable of moving the measuring pin 6 to the advanced deflection position also exerts a resultant force 12 on the ball. This resultant force must be oblique to both the surfaces 16 and 17 to permit a sliding of the surface of the ball 6*a* against the surfaces so that they reach the base of the thread. At this position, the ball 6*a* is at the center 13 shown in FIG. 2. As described in more detail above, according to the invention, if the advanced deflections are exactly annulled when the measuring pin 6 engages the thread surfaces 16 and 17 at a final measuring position, then a judgement is made that the thread is in good condition. Thus it is the deflection amount that is measured and not the actual final measuring head. In other words if the measuring deflection has exactly been met when the measuring head tries to move the pin 6, then a good thread has been measured. If these deflection amounts are not exactly annulled then the thread is bad. Or, a correct measurement has been taken when the advanced deflections have been annulled, signifying a good thread. Conversely, if the advance deflections have not been annulled, then the threads are not of the right dimensions and the workpiece is judged to be bad.

In summary, the invention provides an advance deflection or biasing to the measuring pin to an extent that would bring the pin to a known final deflection point. This deflection point is shown as the phantom line circle at the right of FIG. 2. Deflections 10 and 11 are pre-applied, selected biasing forces which are applied to the measuring pin. According to the invention, these biasing forces are used to cause the pin to slide up against one of the so-called measured surfaces and then to continue moving until contacting the other measured surface.

As discussed above, with the per-established deflections or biasing forces already applied to the measuring pin 6, during its movement the measuring pin 6 would theoretically come into an intermediate position shown at 18 in FIG. 2. In such a position, it is assumed that the spherical head 6*a* of the measuring pin 6 would have already made contact with the measured surface 16 although not at the desired measuring point 14. The spherical head 6*a* would still, however, not be in contact with the other measured surface 17. Due to the presence of radial advance deflection 11, the spherical head 6*a* slides down along surface 16 and makes contact with surface 17 at point 15.

When the ball has contacted both surfaces, the biasing forces may be annulled or offset and a correct measurement taken for the position of surfaces 16 and 17.

The advance deflection is achieved in accordance with the invention by the axial biasing spring 32 shown in FIG. 7, and by radial biasing spring 34 shown in FIG. 4 which pulls the carriage carrying measuring pin 6 radially downward as shown in FIG. 5.

While a specific embodiment of the invention has been shown and described in detail to illustrate the application of the principles of the invention, it will be understood that the invention may be embodied otherwise without departing from such principles.

What is claimed is:

1. A device for measuring the external threads on pipes with a measuring head that has at least one measuring probe that can travel in linear measurement directions for point contacting two measurement surfaces of the external thread forming an angle between them wherein the measuring head (22) is essentially annular and may move freely in the axial direction (7) or (X) over the external thread (1) of the pipe (27) and has a first measuring probe (36) for positioning it on the pipe (27) and a hunting pin (60) at an axial distance from it, that is functionally connected to the first measuring probe (36) contacts in such a way that after the measuring probe (36) contacts with the pipe (27) axially, the hunting pin (60) travels radially into a thread groove (64) of thread (1) when the axial motion of the measuring head (22) is discontinued, and also has at least one other measuring probe (6) located at an axial distance from the hunting pin (60) that is biased forwards simultaneously in two different linear directions of measurement (7X, 8Y) by means of a plurality of springs (32, 34), whose displacements are discontinued when the measuring probe (6) contacts the measurement surfaces (16) and (17), the measuring probe (6) being mounted on the head for travel simultaneously in the two linear directions of measurement (7X, 8Y) independent of one another, with which is associated a direction of force (12) at an angle to the directions of measurement (7X, 8Y); acting as the resultant.

2. A device pursuant to claim 1, characterized by the fact that the measuring probe (6) is equipped with a spherical head (60).

3. A device pursuant to claim 1, characterized by the fact that the measuring probe (6) has a shaped end for engaging the threads of the workpiece.

* * * * *